H. W. FELLOWS.
INTERMITTENT GRIP DEVICE.
APPLICATION FILED MAY 27, 1907.
928,434.
Patented July 20, 1909.
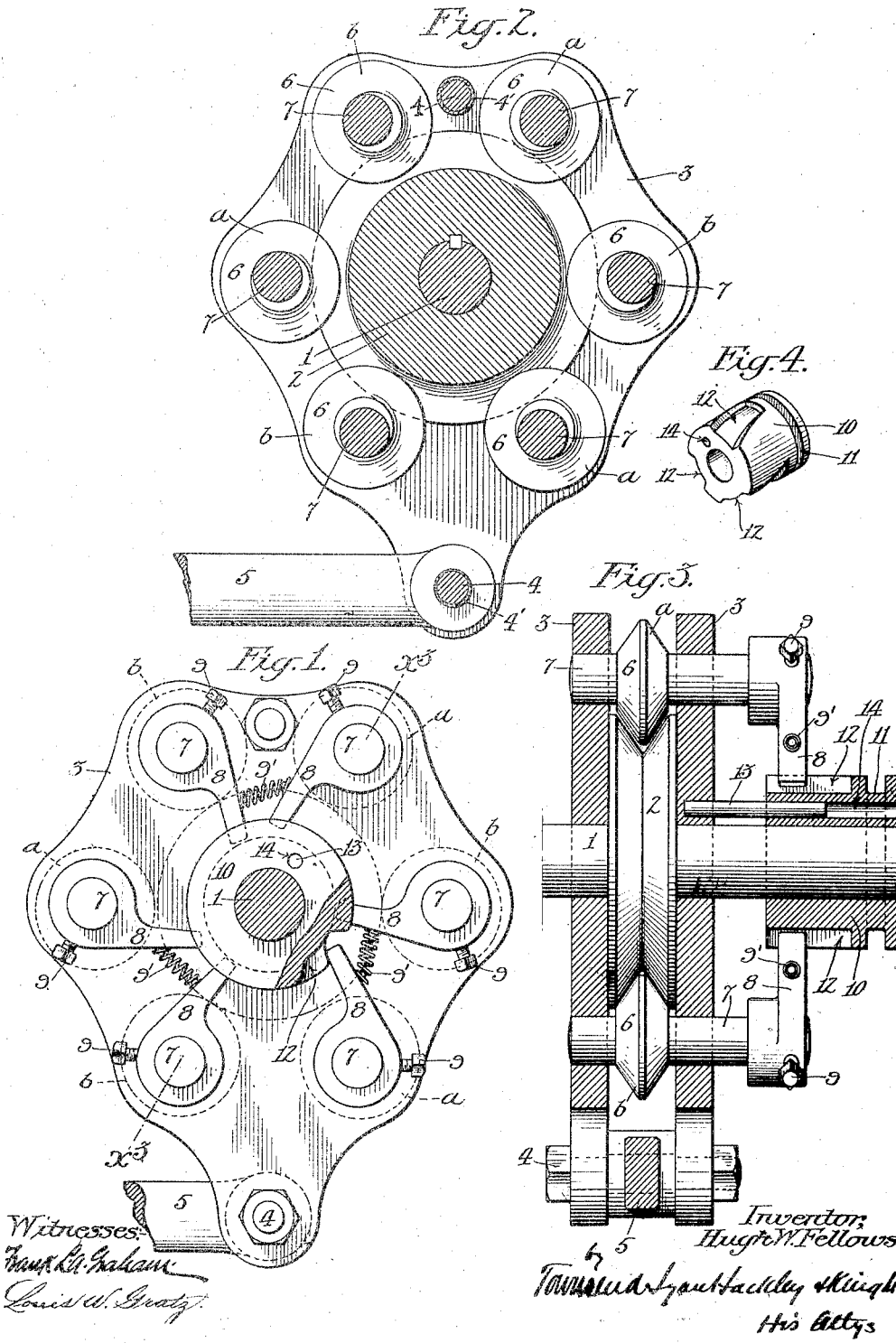

UNITED STATES PATENT OFFICE.

HUGH W. FELLOWS, OF CAHUENGA, CALIFORNIA, ASSIGNOR TO FELLOWS DIRECT POWER TRANSMISSION COMPANY, OF LOS ANGELES, CALIFORNIA, A CORPORATION OF ARIZONA TERRITORY.

INTERMITTENT-GRIP DEVICE.

No. 928,434.      Specification of Letters Patent.      Patented July 20, 1909.

Application filed May 27, 1907. Serial No. 376,025.

*To all whom it may concern:*

Be it known that I, HUGH W. FELLOWS, a citizen of the United States, residing at Cahuenga, in the county of Los Angeles and State of California, have invented a new and useful Intermittent-Grip Device, of which the following is a specification.

This invention relates to an intermittent grip device, and the objects of the invention are to produce a device of that character which may be readily controlled to impart a forward motion or a rearward motion to the driven element, or to release the driven element.

Another object is to produce maximum gripping effect and prevent slippage, a further object being to reduce wear of the parts, and provide simple and economical construction having great strength.

The accompanying drawings illustrate the invention, and referring thereto:—Figure 1 is a side elevation of the invention with a portion of the controlling sleeve broken away. Fig. 2 is a view similar to Fig. 1 with the controlling sleeve, fingers and nearest plate removed. Fig. 3 is a section on line $x^3$—$x^3$ Fig. 1. Fig. 4 is a perspective of the controlling sleeve.

1 designates the driven shaft upon which is keyed a disk 2, the periphery of which has a V groove. Mounted loosely on the shaft 1 on each side of the disk 2 are side plates 3, connected together by bolts 4 upon which are placed the spacing sleeves or collars 4′, one of said sleeves being provided or connected with an operating rod or pitman 5.

A series of rollers 6 are arranged between the plates 3, each roller being mounted on a shaft 7 and the shafts 7 being journaled in the plates 3. Each roller 6 is eccentrically mounted on its shaft 7, as clearly shown in Fig. 2, and the rollers are arranged in two sets, three of the rollers *a* having their eccentric center at one side of a radius drawn from shaft 1 and the other three rollers *b* having their eccentric center at the other side of a radius drawn from shaft 1. The eccentric center of each roller 6 is adjustable by rocking its shaft 7 and the rollers 6 are adapted to grip in the V groove in the disk 2, or to roll idly therein, or to lie free therefrom as will be described.

In Fig. 1, the dotted lines show rollers *b* in engagement with the disk and rollers *a* out of engagement with the disk.

Mounted on the end of each shaft 7 is a finger 8, a set screw 9 serving to hold it adjustably on the shaft, and the fingers 8 are arranged in pairs, one finger 8 of one pair being attached to the shaft of a roller *a* and the other finger of a pair being attached to the adjacent roller *b*, and the two fingers of a pair are connected by a coil tension spring 9′. Mounted to rock and slide on shaft 1 is a controlling sleeve 10 having a grooved collar 11 adapted to be engaged by a forked lever, not shown, for operating the sleeve, and the sleeve is rifled to form three spiral grooves 12. The two fingers of each pair rest in the spiral groove associated therewith. A pin 13 carried by one of the plates 3 projects into a longitudinal hole 14 in the sleeve 10 and serves to oscillate the sleeve in unison with the plates 3 and yet permits the sleeve to be adjusted slidably along the shaft 1.

By sliding the sleeve 10 on shaft 1, the fingers 8 which engage in the spiral grooves of the sleeve may be adjusted to regulate the angular position of the eccentric rollers. Thus, when the sleeve 10 is moved in one direction the fingers of one set of rollers are rocked so that those rollers are free from the grooved disk 2, while the other set of rollers are moved into contact with the grooved disk, and when so adjusted the plates 3, as they rock in one direction, cause the rollers which are in contact with the grooved disk 2 to grip tightly the wedge in the groove in the disk, which results in turning the disk 2 and shaft 1 at an angular speed equal to that of the plates 3. This gripping effect is much greater by reason of the V-shaped contact which affords a wedging effect due to the pressure of the contacting rollers, and the eccentricity of the contacting rollers is such that they have a tendency to roll in and increase the combined gripping and wedging effect. During the back stroke of the plates 3, the contacting rollers roll freely back over the disk 2 without exerting any wedging or gripping effect, as their eccentricity is on the opposite side and there is nothing to cause the rollers to roll into tight engagement, their tendency being to turn the opposite way which loosens the engagement. Thus, during each forward stroke the shaft 1 is operated forward, and during each back stroke the shaft 1 may turn under its momentum or by power derived from another clutch not shown.

By moving the sleeve 10 into its opposite position the relative adjustments of the two sets of rollers are reversed with the result that the disk 2 is driven in the opposite direction, inasmuch as the eccentricity of the contacting rollers lies on the other side of their radii of shaft 1. By moving the sleeve 10 into a central position, both sets of rollers are adjusted so that all of the rollers are out of contact with the disk 2, and when in this position the oscillations of the plates 3 have no operative effect on the shaft 1 and the latter is free to turn in either direction. During the oscillations of the plates 3 the sleeve 10 operates in unison therewith, but there is no relative movement imparted to the fingers 8 until the sleeve 10 is shifted longitudinally.

What I claim is:—

1. In an intermittent grip device, a centrally mounted disk having its periphery provided with a circumferential groove, a supporting member concentrically mounted upon each side of said disk, a plurality of shafts journaled in said members around the periphery of the disk and at an equal distance therefrom, a roller secured eccentrically upon each shaft, the eccentric center of each roller being upon the side of a line drawn from the center of its shaft to the center of the disk, means for simultaneously oscillating said shafts to shift the eccentric centers upon one side of said lines each toward its line and the other centers away from their respective lines, and means for oscillating said supporting members, whereby each alternate roller is moved into engagement with said disk.

2. In an intermittent grip device, a shaft, a disk mounted concentrically thereon having its periphery provided with a circumferential groove, wedge shaped in cross section, a plate mounted upon each side of the disk, shafts journaled in said plates around the periphery of the disk and at an equal distance therefrom, a roller secured eccentrically upon each shaft having its periphery wedge shaped in cross section to fit in the groove of said disk, the eccentric center of each roller being upon the side of a line drawn from the center of its shaft to the center of the disk, means for simultaneously oscillating said shafts to cause the alternate rollers to be moved into contact with said disk and the other rollers to be moved in the opposite direction, and means for oscillating said plates.

3. In an intermittent grip device, a shaft, a circumferentially grooved disk thereon, a plate mounted on each side of the disk, bolts and sleeves for holding said disks in position, a pitman connected with one of said sleeves, a plurality of shafts in said plates around the disk at an equal distance from its periphery, a roller secured eccentrically on each shaft in position to be moved into and out of engagement with the periphery of said disk, and means for simultaneously oscillating said shafts to cause the alternate rollers to be moved into engagement with said disk and the other rollers to be moved in the opposite direction.

4. In an intermittent grip device, a disk, an oscillatory member concentric with the disk, a series of rollers adapted to contact with the disk carried by the oscillatory member, shafts journaled in said member, said rollers being eccentrically mounted on said shafts, fingers on the respective shafts, and means oscillating with said oscillatory member and slidable with relation thereto and engaging said fingers for swinging the fingers to vary the angular position of eccentricity of the rollers when the finger engaging means is moved longitudinally.

5. In an intermittent grip device, a disk, an oscillatory member concentric with the disk, a series of rollers adapted to contact with the disk carried by the oscillatory member, shafts journaled in said member, said rollers being eccentrically mounted on said shafts, fingers on the respective shafts, means oscillating with said oscillatory member and slidable with relation thereto and engaging said fingers for swinging the fingers to vary the angular position of eccentricity of the rollers when the finger engaging means is moved longitudinally, the rollers being arranged in two sets, the eccentricity of the rollers of one set being on one side of radial lines through the disk and the eccentricity of the other set being on the opposite side of radial lines through the disk, the two adjacent fingers of each two adjacent rollers of different sets forming a pair.

6. In an intermittent grip device, a shaft, a disk fastened on the shaft, a pair of plates mounted to rock on the shaft and arranged on opposite sides of the disk, a series of rollers adapted to contact with the periphery of the disk, shafts journaled in said plates and carrying the respective rollers, each roller having its periphery eccentric of its shaft, fingers on the respective shafts, a controlling sleeve loosely mounted on the shaft and adapted to rock and slide thereon, a pin projecting from one of said plates into a hole in said sleeve, the sleeve having spiral grooves, each groove receiving the ends of two of said fingers, the two rollers associated with each pair of two fingers having their eccentric centers arranged opposite to each other, and a tension spring connecting the two fingers of each pair of fingers.

In testimony whereof, I have hereunto set my hand at Los Angeles, California, this 20th day of May 1907.

HUGH W. FELLOWS.

In presence of—
GEORGE T. HACKLEY,
FRANK L. A. GRAHAM.